(12) United States Patent
Kong et al.

(10) Patent No.: US 11,450,066 B2
(45) Date of Patent: Sep. 20, 2022

(54) 3D RECONSTRUCTION METHOD BASED ON DEEP LEARNING

(71) Applicant: Beijing University of Technology, Beijing (CN)

(72) Inventors: Dehui Kong, Beijing (CN); Caixia Liu, Beijing (CN); Shaofan Wang, Beijing (CN); Jinghua Li, Beijing (CN); Lichun Wang, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 133 days.

(21) Appl. No.: 16/808,395

(22) Filed: Mar. 4, 2020

(65) Prior Publication Data
US 2020/0294309 A1    Sep. 17, 2020

(30) Foreign Application Priority Data
Mar. 11, 2019  (CN) .......................... 201910179121.X

(51) Int. Cl.
*G06T 17/00* (2006.01)
*G06T 17/20* (2006.01)
*G06N 3/04* (2006.01)
*G06N 3/08* (2006.01)

(52) U.S. Cl.
CPC ........... *G06T 17/20* (2013.01); *G06N 3/0454* (2013.01); *G06N 3/0481* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 2007/0103464 A1* | 5/2007 | Kaufman | G06T 7/0012 345/424 |
| 2010/0013832 A1* | 1/2010 | Xiao | G06K 9/00281 345/420 |
| 2018/0129893 A1* | 5/2018 | Son | G06N 3/063 |
| 2019/0114748 A1* | 4/2019 | Lin | G06N 3/0454 |
| 2019/0287247 A1* | 9/2019 | Duchesne | G06T 7/174 |
| 2019/0385292 A1* | 12/2019 | Gould | G06T 7/00 |
| 2020/0065682 A1* | 2/2020 | Paulina | G16H 20/70 |
| 2020/0067969 A1* | 2/2020 | Abbaszadeh | G06K 9/6269 |
| 2020/0081912 A1* | 3/2020 | Hong | G06F 16/583 |

(Continued)

OTHER PUBLICATIONS

Bo Yang, et al., 3D Object Dense Reconstruction from a Single Depth View, Feb. 1, 2018, pp. 1-13.

(Continued)

*Primary Examiner* — Anh-Tuan V Nguyen
(74) *Attorney, Agent, or Firm* — Bayramoglu Law Offices LLC

(57) ABSTRACT

3D reconstruction method based on deep learning includes the following steps: (1) The potential vector constrained in the input image is used to reconstruct the complete 3D shape of the target, and the mapping between the part and the complete 3D shape is learned, then the 3D reconstruction of a single depth image is realized. (2) Learn the intermediate feature representation between the 3D real object and the reconstructed object to obtain the target potential variables in step (1). (3) The voxel floating value predicted in step (1) is transformed into binary value by using the limit learning machine to complete high-precision reconstruction.

6 Claims, 3 Drawing Sheets

(56) References Cited

U.S. PATENT DOCUMENTS

| | | | |
|---|---|---|---|
| 2020/0134465 A1* | 4/2020 | Seo ........................ | G06T 19/20 |
| 2020/0184190 A1* | 6/2020 | Chang Lee .............. | G06N 3/08 |
| 2020/0193607 A1* | 6/2020 | Sun ........................ | G06N 3/088 |
| 2020/0202622 A1* | 6/2020 | Gallo ..................... | G06T 17/205 |
| 2020/0364555 A1* | 11/2020 | Grau-Moya ........... | G06N 7/005 |
| 2020/0372626 A1* | 11/2020 | Dal Mutto ............. | G06T 17/00 |

OTHER PUBLICATIONS

Bo Yang, et al., 3D Object Reconstruction from a Single Depth View with Adversarial Learning, pp. 679-688, [2017].

Renato Hermoza, et al., 3D Reconstruction of Incomplete Archaeological Objects Using a Generative Adversarial Network, Mar. 10, 2018, pp. 1-7.

Rohit Girdhar, et al., Learning a Predictable and Generative Vector Representation for Objects, Aug. 31, 2016.

Panos Achlioptas, et al., Learning Representations and Generative Models for 3D Point Clouds, Dec. 5, 2017, pp. 1-22.

Jiajun Wu, et al., MarrNet: 3D Shape Reconstruction via 2.5D Sketches, 31st Conference on Neural Information Processing Systems (NIPS 2017), Long Beach, CA, USA, pp. 1-11.

Jacob Varley, et al., Shape Completion Enabled Robotic Grasping, Mar. 2, 2017.

* cited by examiner

The potential vector constrained in the input image is used to reconstruct the complete 3D shape of the target, and thE mapping between the part and the complete 3D shape is learned, then the 3D reconstruction of a single depth image is realized.

Learn the intermediate featUre representation between the 3D real object and the reconstructed object to obtain the target potential variables in step (1).

The voxel floating value predicted in step (1) is transformed into binary value by using the limit learning machine to complete high-precision reconstruction.

FIG.3

3D RECONSTRUCTION METHOD BASED ON DEEP LEARNING

CROSS REFERENCE TO THE RELATED APPLICATIONS

This application is based upon and claims priority to Chinese Patent Application No. CN201910179121X, filed on Mar. 11, 2019, the entire contents of which are incorporated herein by reference.

TECHNICAL FIELD

The present invention relates to the technical field of computer vision and pattern recognition, and particularly to 3D reconstruction method based on deep learning.

BACKGROUND

The 3D reconstruction based on vision is the calculation process and technology of the 3D information (shape, texture, etc.) of the object recovered from the image obtained by the vision sensor. Reconstructing accurate 3D model of an object from images is essential for many applications, such as cultural relics restoration, robot grasping and obstacle avoidance. At present, the traditional 3D reconstruction methods have some limitations, including: cameras calibrated accurately and high-quality visual imaging elements are needed; the reconstruction process includes image preprocessing, point cloud registration, data fusion and other steps, which is easy to cause error accumulation and reduce the reconstruction accuracy; and it is difficult to reconstruct the shape of the part of the perceptual object that is occluded or information lost. These defects lead to the low quality of the reconstruction results of traditional methods, so they can't be widely used in practice. Therefore, high-precision 3D reconstruction based on vision has a great challenge.

In recent years, the rapid development of deep learning and the availability of a large number of 3D CAD models have brought new ideas to traditional 3D reconstruction methods. At present, more common methods based on depth learning use depth generation model, such as generative adversarial networks (GAN), auto encoder (AE) and variational auto encoder (VAE), to reconstruct 3D images from a single perspective. The main framework of these methods includes two stages: encoding and decoding. In the encoding stage, the input data is encoded as potential features, and in the decoding stage, the features are decoded to generate a complete 3D shape. The reconstruction method based on GAN uses random noise as input and ensures the reconstruction accuracy through the confrontation between the discriminator and the generator. However, because the random noise can't reflect the prior information of the reconstruction object, the reconstruction result is not specific. The reconstruction method based on AE only regards the minimal reconstruction loss of the generator as the optimization goal and does not consider the confrontation loss of the discriminator, so that the reconstruction results are limited by the known input information and difficult to expand the unknown part. Naturally, by combining the prior information maintained by AE methods with the discriminant ability of GAN methods, the decoder of AE is set as the generator of GAN, which can overcome the defects of the above two methods at the same time. However, although this method based on GAN and AE fusion improves the reconstruction accuracy, it can't completely recover the occluded and missing areas, and will generate noise, which is more obvious in the process of cross category reconstruction of the model.

SUMMARY

The technical problem addressed by the present invention is to overcome the deficiency in the prior art, and to provide 3D reconstruction method based on deep learning, which does not need to design complex feature algorithm manually, can avoid complex camera calibration and fine process design, and has the ability to expand "what you know" and rebuild "what you don't know" by learning "what you see", which can make up for the inherent defect of traditional reconstruction method "what you know is what you see", so that it can't only highly preserve the input depth information, but also accurately predict the missing part of the object to achieve high precision 3D reconstruction. The technical solution of the present invention is that, in this 3D reconstruction method based on deep learning, which includes the following steps:

(1) The potential vector constrained in the input image is used to reconstruct the complete 3D shape of the target, and the mapping between the part and the complete 3D shape is learned, then the 3D reconstruction of a single depth image is realized.
(2) Learn the intermediate feature representation between the 3D real object and the reconstructed object to obtain the target potential variables in step (1).
(3) The voxel floating value predicted in step (1) is transformed into binary value by using the limit learning machine to complete high-precision reconstruction.

The invention uses the depth neural network to extract high-performance features and avoid the accumulation of multi loop error in artificial design; by learning the potential information of 3D shape, the input image is constrained so that the missing part can be accurately predicted; the predicted 3D shape is constrained by the consistency of depth projection, so that the input information can be highly preserved; the spatial local pattern classification is used to reconstruct the predicted 3D shape in binary way and achieve high precision 3D reconstruction. Therefore, this method does not need to design complex feature algorithm manually, can avoid complex camera calibration and fine process design, and has the ability to expand "what you know" and rebuild "what you don't know" by learning "what you see", which can make up for the inherent defect of traditional reconstruction method "what you know is what you see", so that it can't only highly preserve the input depth information, but also accurately predict the missing part of the object to achieve high precision 3D reconstruction.

BRIEF DESCRIPTION OF THE DRAWINGS

FIG. 1 shows a general flowchart of 3D reconstruction method based on deep learning according to the present invention.

FIG. 3 is a flowchart of 3D reconstruction method based on deep learning according to the present invention.

DETAILED DESCRIPTION OF THE EMBODIMENTS

Figure 1A:
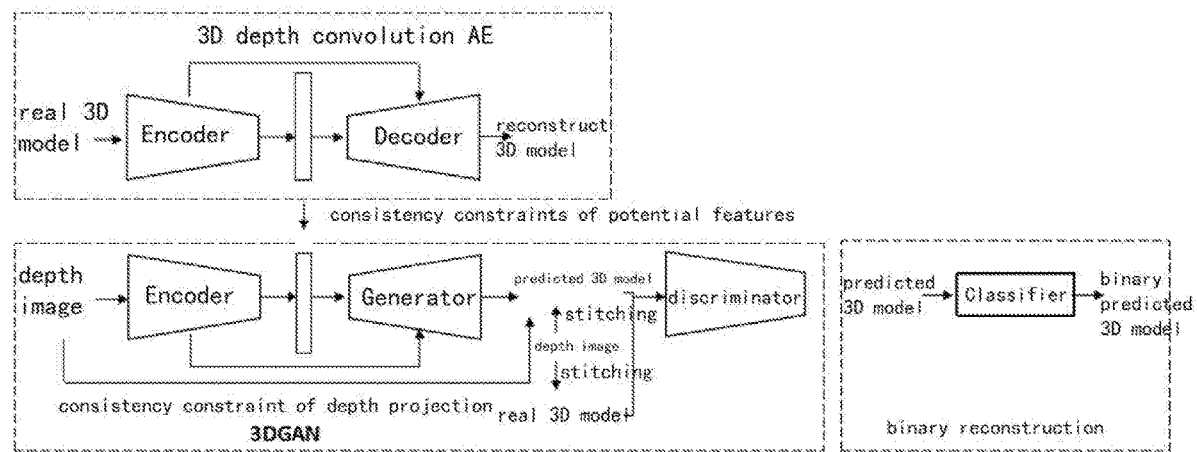
FIG. 1A is a general flowchart of training.

As shown as FIG. 3, this 3D reconstruction method based on deep learning, which includes the following steps:

(1) The potential vector constrained in the input image is used to reconstruct the complete 3D shape of the target, and the mapping between the part and the complete 3D shape is learned, then the 3D reconstruction of a single depth image is realized.

(2) Learn the intermediate feature representation between the 3D real object and the reconstructed object to obtain the target potential variables in step (1).

(3) The voxel floating value predicted in step (1) is transformed into binary value by using Extreme Learning Machine (ELM) to complete high-precision reconstruction.

The invention uses the depth neural network to extract high-performance features and avoid the accumulation of multi loop error in artificial design; by learning the potential information of 3D shape, the input image is constrained so that the missing part can be accurately predicted; the predicted 3D shape is constrained by the consistency of depth projection, so that the input information can be highly preserved; the spatial local pattern classification is used to reconstruct the predicted 3D shape in binary way and achieve high precision 3D reconstruction. Therefore, this method does not need to design complex feature algorithm manually, can avoid complex camera calibration and fine process design, and has the ability to expand "what you know" and rebuild "what you don't know" by learning "what you see", which can make up for the inherent defect of traditional reconstruction method "what you know is what you see", so that it can't only highly preserve the input depth information, but also accurately predict the missing part of the object to achieve high precision 3D reconstruction.

Preferably, the mentioned step (1) includes the following steps:

(1.1) Reconstruction of 3D GAN and Realization of discriminant constraints (1.2) Realization of consistency constraints of potential features (1.3) Realization of consistency constraint of depth projection Preferably, the mentioned step (1.1) uses the improved Wasserstein GAN to train. for the generator, 3D generator loss $L_g$ is defined as formula (1):

$$L_g = \eta(-\beta y_t \log(y_p) - (1-\beta)(1-y_t)\log(1-y_p)) - (1-\eta)E[D(y_p|x)] \quad (1)$$

Where x, $y_t$, $y_p$ respectively represent 3D voxel value converted for the depth image, the ground truth value and 3D object value generated by the network. In the experiment β is set to 0.85, η is set to 5.

For the discriminator, 3D GAN optimizes parameters by narrowing the Wasserstein distance between the real pair and the fake pair. The discriminator loss $L_d$ is defined as:

$$L_d = E[D(y_p|x)] - E[D(y_t|x)] + \lambda E[(\|\nabla_{\hat{y}} D(\hat{y}_t|x)\|_2 - 1)^2] \quad (2)$$

Where $\hat{y} = \varepsilon x + (1-\varepsilon) y_p$, $\varepsilon \sim U[0,1]$. λ controls the tradeoff between optimizing the gradient penalty and the original objective.

Preferably, in the mentioned step (1.2), the potential vectors of the input image are constrained by the potential feature vector information of the learned 3D real object to guide the model to generate the target 3D shape data, so that the missing part can be accurately predicted. The latent vector $L_l$ is defined as:

$$L_l = E(Z_t) - E(Z_p) \quad (3)$$

Where $Z_t$ is a latent vector decoded by a 3D ground truth object, $Z_p$ is decoded by input depth image, and $E(\cdot)$ denotes the expectation.

Preferably, in the mentioned step (1.3), a projection constraint is applied between the predicted 3D shape and the input depth image. The depth value after projection is consistent with the input depth value, so as to improve the fidelity of the input information, so that the model can fine tune the generated 3D shape. The loss function $L_{project}$ is the formula (4):

$$L_{projection} = \begin{cases} y_{p(x,y,z)}^2 & z < d_{x,y} \\ (1 - y_{p(x,y,z)})^2 & z = d_{x,y} \\ 0 & z > d_{x,y} \end{cases} \quad (4)$$

Where $y_{p(x,y,z)}$ represents the value of the predicted 3D shape $y_p$ at the position (x,y,z), $y_{p(x,y,z)} \in \{0,1\}$, $d_{x,y}$ is the depth value of the input image x at the position (x,y).

Preferably, in the mentioned step (2), using a 3D depth convolution AE with jump connection, the feature layer of the encoder will be connected to the decoder accordingly. Preferably, in the mentioned step (2), the network structure includes an encoder and a decoder: the encoder has four 3D convolution layers, each convolution layer has a bank of 4×4×4 filters of 1×1×1 strides, followed by a leaky ReLU activation function and a maximum pooling layer; then there are two fully connected layers, the second fully connected layer is the potential vector learned; the decoder consists of four symmetric anti convolution layers. Each layer concatenates the feature layers of the encoder accordingly, followed by ReLU activations except for the last layer with sigmoid function. The whole calculation process is: $64^3(1) \rightarrow 32^3(64) \rightarrow 16^3(128) \rightarrow 8^3(256) \rightarrow 4^3(512) \rightarrow 32768 \rightarrow 5000 \rightarrow 32768 \rightarrow 4^3(512) \rightarrow 8^3(256) \rightarrow 16^3(128) \rightarrow 32^3(64) \rightarrow 64^3(1)$.

Preferably, in the mentioned step (2), by making the predicted 3D shape as close as possible to the real 3D shape to optimize network parameters, its objective function $L_t$ is the formula (5):

$$L_t = -\alpha y_t \log(y'_t) - (1-\alpha)(1-y_t)\log(1-y'_t) \quad (5)$$

Where $y_t$ is the ground truth value for each voxel, $y'_t$ is the predicted value for each voxel. Cross entropy is used to measure the quality of reconstruction. For the value of most voxel grids of each object are zero, weight α is applied to the false positive and false negative samples to balance them. In the experiment α is set to 0.85.

Preferably, in the mentioned step (3), nonlinear binary reconstruction is applied to voxel set output by the generator with ELM classifier.

Preferably, in the mentioned step (3), it has three layers in the network: an input layer, a hidden layer and an output layer. Input is the feature of each voxel mesh of the object. The neighborhood value around each voxel mesh is extracted as the feature value, and a 7-dimensional feature vector is established. The number of hidden layer nodes is determined about 11 by multiple experiments. The output is to judge whether the label of each voxel is 0 or 1.

If the incentive function is infinitely differentiable over any real number interval for ELM, the network approximates any nonlinear function, and the classifier loss function $L_c$ is the formula (6):

$$L_c = y_f^{voxel} - y_t^{voxel} \quad (6)$$

Where $y_f^{voxel}$ is the value of each voxel mesh after binary reconstruction, $y_t^{voxel}$ is the value of each voxel mesh of the real object.

The invention is described in more detail below.

Figure 1B:
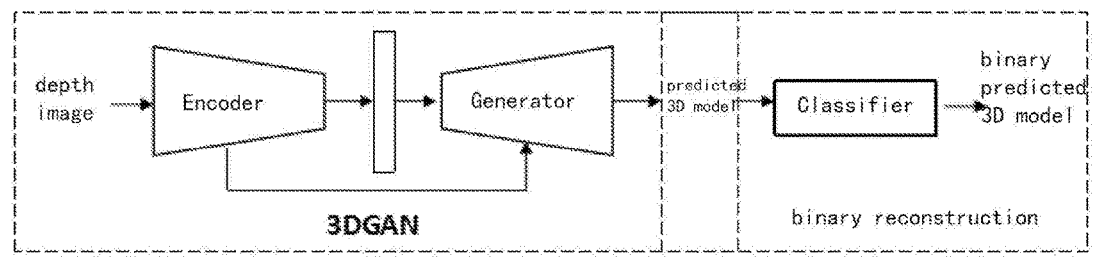
FIG. 1B is a general flowchart of testing.

3DGAN-LFPC provided by the present invention consists of three components: 1) 3D GAN: The potential vector constrained in the input image is used to reconstruct the complete 3D shape of the target. 2) 3D depth convolution AE: Learn the intermediate feature representation between the 3D real object and the reconstructed object to obtain the target potential variables in step (1). 3) a spatially local pattern classifier: The voxel floating value predicted in step (1) is transformed into binary value by using Extreme Learning Machine (ELM) to complete high-precision reconstruction. A general flowchart of training and testing 3DGAN-LFPC is shown in FIG. 1, and a detailed flowchart of training 3DGAN-LFPC is shown in FIG. 2.

1) 3D GAN: This part is mainly to learn a mapping between partial and complete 3D shapes, and reconstruct 3D shape from a monocular depth image under the supervised of the target vector in the Deep 2D AE. There are two main innovations in this part. One is that we constrain the potential eigenvectors of the input image to guide the 3D GAN to accurately predict the missing parts of the 3D shape. The other is that we constrain the depth projection consistency of the predicted 3D shape to improve the fidelity of the input information and achieve high-precision 3D reconstruction. In this part, 3D GAN network structure based on 3D depth convolution AE is adopted.

Figure 2:
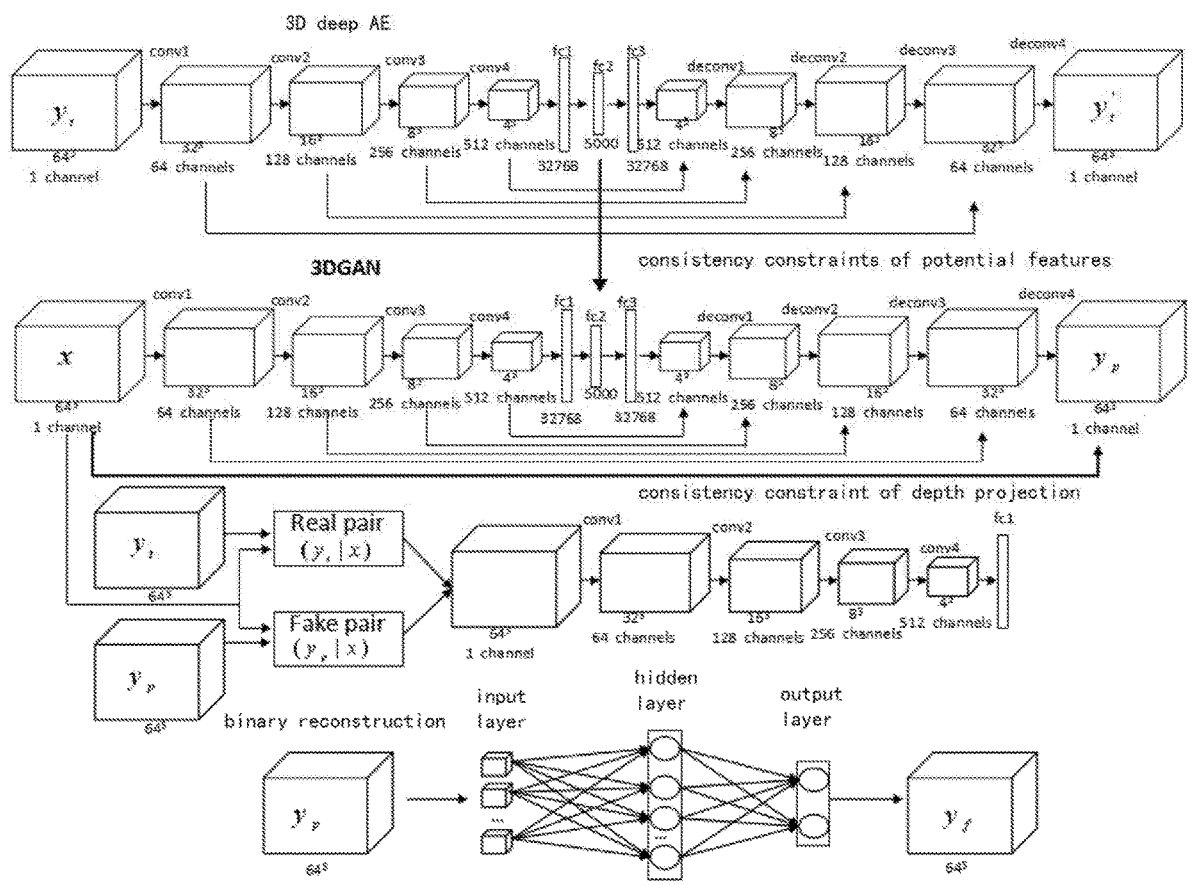
FIG. 2 shows a flowchart of training in details.

The network structure of this part mainly includes 3D generator and 3D discriminator, as shown in 3D GAN part of FIG. 2. The specific design is as follows: coding part of the encoder has four 3D convolution layers, each convolution layer has a bank of 4×4×4 filters of 1×1×1 strides, followed by a leaky ReLU activation function and a maximum pooling layer; then there are two fully connected layers, the second fully connected layer is the potential vector learned; the decoder consists of four symmetric anti convolution layers. Each layer concatenates the feature layers of the encoder accordingly, followed by ReLU activations except for the last layer with sigmoid function. The whole calculation process is: $64^3(1) \to 32^3(64) \to 16^3(128) \to 8^3(256) \to 4^3(512) \to 32768 \to 5000 \to 32768 \to 4^3(512) \to 8^3(256) \to 16^3(128) \to 32^3(64) \to 64^3(1)$. Wherein the number of convolution kernels in brackets is the number of channels. For the discriminator, the real pair and predicted pair are input, and the network structure is an encoder composed of four 3D convolution layers, each convolution layer has a bank of 4×4×4 filters of 2×2×2 strides, and then ReLU activation function. Then there is a full connection layer, and finally Sigmoid activation function is used. The whole calculation process is $64^3(2) \to 32^3(64) \to 16^3(128) \to 8^3(256) \to 4^3(512) \to 32768$.

The loss function of this part mainly includes 3D generator loss $L_g$, 3D discriminator loss $L_d$, potential feature loss $L_l$ and depth projection loss $L_{depth}$. The details of each part are as follows.

i. Reconstruction of 3D GAN and Realization of Discriminant Constraints

In view of the problem that the gradient is easy to disappear and the network is difficult to converge in the original GAN training, the invention adopts the improved Wasserstein GAN for training. For generator, the invention combines the reconstruction loss of AE and GAN as the objective function $L_g$:

$$L_g = \eta(-\beta y_t \log(y_p) - (1-\beta)(1-y_t)\log(1-y_p)) - (1-\eta)E[D(y_p|x)] \quad (1)$$

Where x, $y_t$, $y_p$ respectively represent 3D voxel value converted for the depth image, the ground truth value and 3D object value generated by the network. In the experiment β is set to 0.85, η is set to 5.

For the discriminator, 3D GAN optimizes parameters by narrowing the Wasserstein distance between the real pair and the fake pair. The discriminator loss $L_d$ is defined as:

$$L_d = E[D(y_p|x)] - E[D(y_t|x)] + \lambda E[(\|\nabla_{\hat{y}} D(\hat{y}_t|x)\|_2 - 1)^2] \quad (2)$$

Where $\hat{y} = \varepsilon x + (1-\varepsilon)y_p, \varepsilon \sim U[0,1]$. λ controls the tradeoff between optimizing the gradient penalty and the original objective.

ii. Realization of Consistency Constraints of Potential Features

In the unconditional generation model, we can't control the network to generate the required target model. For 3D reconstruction, its result is obtained by decoding latent feature vectors, and its accuracy depends on the learning quality of latent vector. In fact, a good potential vector should not only be able to reconstruct 3D objects, but also be able to predict from 2D images. Therefore, the invention innovatively uses the potential feature vector information of the learned 3D real object to constrain the potential vector of the input image to guide the model to generate the target 3D shape data, so that the missing part can be accurately predicted. Its loss function $L_l$ is defined as:

$$L_l = E(Z_t) - E(Z_p) \quad (3)$$

Where $Z_t$ is a latent vector decoded by a 3D ground truth object, $Z_p$ is decoded by input depth image, and E(·) denotes the expectation.

iii. Realization of Consistency Constraint in Depth Projection

The predicted 3D shape should be consistent with 2D view, which is helpful for the training of 3D reconstruction using depth learning. Therefore, a projection constraint is applied between the predicted 3D shape and the input depth image, that is, the depth value after projection is consistent with the input depth value, so as to improve the fidelity of the input information, so that the model can fine tune the generated 3D shape. Its loss function $L_{project}$ is:

$$L_{projection} = \begin{cases} y_{p(x,y,z)}^2 & z < d_{x,y} \\ (1 - y_{p(x,y,z)})^2 & z = d_{x,y} \\ 0 & z > d_{x,y} \end{cases} \quad (4)$$

Where $y_{p(x,y,z)}$ represents the value of the predicted 3D shape $y_p$ at the position (x,y,z), $y_{p(x,y,z)} \in \{0,1\}$, $d_{x,y}$ is the depth value of the input image x at the position (x,y).

2) 3D depth convolution AE: in order to obtain $Z_t$, this part uses the idea of AE image generation to learn a good potential spatial representation of 3D real objects, that is, to ensure that $Z_t$ can accurately contain complete 3D shape information. The invention adopts a 3D depth convolution AE with jump connection, that is, the feature layer of the encoder will be connected to the decoder correspondingly, and the jump connection ensures the propagation of local features of a single depth image, and provides more complete information for learning a reasonable and complete 3D object shape.

The network structure of this part mainly includes 3D generator and 3D discriminator, as shown in 3D depth convolution AE part of FIG. 2. The specific design is as follows: coding part of the encoder has four 3D convolution layers, each convolution layer has a bank of 4×4×4 filters of 1×1×1 strides, followed by a leaky ReLU activation function and a maximum pooling layer; then there are two fully connected layers, the second fully connected layer is the potential vector learned; the decoder consists of four symmetric anti convolution layers. Each layer concatenates the feature layers of the encoder accordingly, followed by ReLU activations except for the last layer with sigmoid function. The whole calculation process is: $64^3(1) \rightarrow 32^3(64) \rightarrow 16^3 (128) \rightarrow 8^3(256) \rightarrow 4^3(512) \rightarrow 32768 \rightarrow 5000 \rightarrow 32768 \rightarrow 4^3(512) \rightarrow 8^3(256) \rightarrow 16^3(128) \rightarrow 32^3(64) \rightarrow 64^3(1)$.

By making the predicted 3D shape as close as possible to the real 3D shape to optimize network parameters, its objective function $L_t$ is the formula (5):

$$L_t = -\alpha y_t \log(y'_t) - (1-\alpha)(1-y_t)\log(1-y'_t) \quad (5)$$

Where $y_t$ is the ground truth value for each voxel, $y'_t$ is the predicted value for each voxel. Cross entropy is used to measure the quality of reconstruction. For the value of most voxel grids of each object are zero, weight $\alpha$ is applied to the false positive and false negative samples to balance them. In the experiment $\alpha$ is set to 0.85.

3) Nonlinear voxel binarization: in most literatures, linear classifiers are used to binary reconstruct 3D voxel output by the generator. However, the binary classification of voxel space corresponding to the reconstructed model does not satisfy the linearization constraints. In order to make full use of the prior information from the training set and improve the reconstruction result, the invention uses the ELM classifier idea to reconstruct the voxel set output by the generator in a nonlinear binary way. This method of voxel binary reconstruction based on learning improves the prediction accuracy of the missing part of the object due to acquiring the prior knowledge of the object from the training set.

The network of this part has three layers: an input layer, a hidden layer and an output layer, as shown as the binary reconstruction part in FIG. 2. Input is the feature of each voxel mesh of the object. The neighborhood (up, down, right, left, front, back) value around each voxel mesh is extracted as the feature value, and a 7-dimensional feature vector is established. The number of hidden layer nodes is determined about 11 by multiple experiments. The output is to judge whether the label of each voxel is 0 or 1.

If the incentive function is infinitely differentiable over any real number interval for ELM, the network approximates any nonlinear function, and the classifier loss function $L_c$ is the formula (6):

$$L_c = y_f^{voxel} - y_t^{voxel} \quad (6)$$

Where $y_f^{voxel}$ is the value of each voxel mesh after binary reconstruction $y_t^{voxel}$ is the value of each voxel mesh of the real object.

In conclusion, 3D GAN-LFPC proposed in the invention includes 3D GAN generator loss (see formula (1)), discriminator loss (see formula (2)), potential feature loss (see formula (3), (4)), depth projection loss (see formula (5)) and voxel classification loss (see formula (6)). Adam algorithm is adopted for model optimization, and the optimization sequence is (4), (3), (2), (1), (5), (6).

The invention uses the disclosed Model Net database to generate training and test data sets. The specific operation is as follows. For each CAD model, the invention creates a virtual depth camera, scans it from 125 different angles, and evenly samples 5 viewing angles in each pitch angle, yaw angle and roll angle direction. In the above way, the depth image and the corresponding complete 3D shape are obtained, and then the depth image and the 3D shape are voxeled into a dimensional 3D mesh 64×64×64 by using the virtual camera parameters. Each voxel mesh is represented as a binary tensor: 1 for voxels occupied, 0 for voxels not occupied.

The invention uses Intersection over Union (IoU) of 3D voxel to evaluate the performance of 3D reconstruction. IoU represents the similarity between the predicted 3D voxel mesh and the real voxel mesh, which is defined as follows:

$$IoU = \frac{\sum_{ijk}\left[I\left((y_f)_{ijk}\right) * I(y_{ijk})\right]}{\sum_{ijk}\left[I\left((y_f)_{ijk}\right) + I(y_{ijk})\right]}$$

Where I( ) is the indicator function, (i,j,k) is the 3D index of a voxel mesh, $(y_f)_{ijk}$ is the predicted value at the (i,j,k) voxel, $y_{ijk}$ is the real value at the (i,j,k) voxel. The value of IoU of a 3D shape is [0.1]. The closer the value of IoU is to 1, the better the reconstruction effect is.

The invention has made relevant experiments, and compared the proposed 3D GAN-LFPC with the classical reconstruction methods including: Poisson surface reconstruction method and the method based on 3D RecGAN framework proposed by Yang et al. At the same time, in order to verify the effectiveness and performance of each constraint proposed in the invention, two reconstruction models of simplified versions of 3D GAN-LFPC reconstruction model, 3D GAN-LFC (only potential feature consistency constraint) and 3D GAN-PC (only depth projection consistency constraint), are proposed for comparison experiments.

(1) Per-category Results. The network is separately trained and tested on three different categories with the same network configurations. The comparative results are shown in Table 1.

TABLE 1

| Method | Chair | Stool | Toilet |
| --- | --- | --- | --- |
| Possion | 0.180 | 0.189 | 0.150 |
| 3D-RecGAN | 0.219 | 0.196 | 0.195 |
| 3D GAN-LFC | 0.224 | 0.248 | 0.205 |
| 3D GAN-PC | 0.319 | 0.269 | 0.202 |
| 3D GAN-LFPC | 0.358 | 0.380 | 0.279 |

(2) Cross-category Results. To further investigate the generality, the network is trained on one category, but tested on another two different categories.

Particularly, in group 1, the network is trained on chair, tested on stool, toilet; in group 2, the network is trained on stool, tested on chair, toilet; in group 3, the network is trained on toilet, tested on chair, stool. The comparative results are shown in Table 2.

TABLE 2

| Method | Group 1 | Group 2 | Group 3 |
| --- | --- | --- | --- |
| 3D-RecGAN | 0.254 | 0.217 | 0.130 |
| 3D GAN-LFC | 0.285 | 0.234 | 0.177 |
| 3D GAN-PC | 0.292 | 0.269 | 0.206 |
| 3D GAN-LFPC | 0.300 | 0.275 | 0.213 |

In general, 3DGAN-LFPC proposed by the invention is superior to the traditional reconstruction method and reconstruction method based on deep learning, that is, it can recover the 3D object structure with higher accuracy in the case of a single depth image. In the process of training, 3DGAN-LFPC optimizes the potential feature vector of input image by learning the generation network of 3D real object, which provides direction for shape reconstruction of model. Moreover, 3DGAN-LFPC uses the potential eigenvector optimized by self-encoder to replace the random input of GAN, which improves the performance of the model. In addition, 3DGAN-LFPC implements depth projection consistency constraint on the predicted 3D shape, avoids the generation of uncorrelated noise, and better captures the details of the object surface. At last, 3DGAN-LFPC improves the reconstruction quality by using the nonlinear voxel binarization. In a word, the model of the invention can make better use of the prior knowledge of the object, that is to say, it can expand the "seeing" by "learning", better reconstruct the occluded and missing areas of the target object, and can learn the variability and correlation of the geometric features between different object categories.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A 3D reconstruction method based on deep learning, comprising the following steps:
   (1) using a potential vector constrained in an input image to reconstruct a complete 3D shape of a target, and learning a mapping between a part and the complete 3D shape, then realizing a 3D reconstruction of a single depth image,
   (2) learning an intermediate feature representation between a 3D real object and a reconstructed object to obtain a plurality of target potential variables in step (1),
   (3) transforming a voxel floating value predicted in step (1) into a binary value by using a limit learning machine to complete a high-precision reconstruction; wherein step (1) comprises the following steps:
   (1.1) reconstruction of a 3D GAN and realization of discriminant constraints,
   (1.2) realization of a plurality of consistency constraints of a plurality of potential features,
   (1.3) realization of a consistency constraint of a depth projection; wherein
   step (1.1) uses an improved Wasserstein GAN to train, for a generator, a 3D generator loss $L_g$ is defined as formula (1):

$$L_g = \eta(-\beta y_t \log(y_p) - (1-\beta)(1-y_t)\log(1-y_p)) - (1-\eta)E[D(y_p|x)] \quad (1),$$

wherein x, $y_t$, $y_p$ respectively represent a 3D voxel value converted for a depth image, a ground truth value and a 3D object value generated by a network, in an experiment $\beta$ is set to 0.85, $\eta$ is set to 5,
   for a discriminator, the 3D GAN optimizes a plurality of parameters by narrowing a Wasserstein distance between a real pair and a fake pair, the discriminator loss $L_d$ is defined as:

$$L_d = E[D(y_p|x)] - E[D(y_t|x)] + \lambda E[(\|\nabla_{\hat{y}} D(\hat{y}|x)\|_2 - 1)^2] \quad (2),$$

wherein $\hat{y} = \varepsilon x + (1-\varepsilon)y_p$, $\varepsilon \sim U[0,1]$, $\lambda$ controls a tradeoff between optimizing a gradient penalty and an original objective;

wherein
   in step (1.2), a plurality of potential vectors of the input image are constrained by a potential feature vector information of a learned 3D real object to guide a model to generate a target 3D shape data, to accurately predict a missing part, a latent vector $L_l$ is defined as:

$$L_l = E(Z_t) - E(Z_p) \quad (3),$$

wherein $Z_t$ is the latent vector decoded by a 3D ground truth object, $Z_p$ is decoded by an input depth image, and $E(\cdot)$ denotes an expectation;
   wherein
   in step (1.3), a projection constraint is applied between a predicted 3D shape and the input depth image, a depth value after projection is consistent with an input depth value to improve a fidelity of an input information, to allow the model fine tune a generated 3D shape, a loss function $L_{projection}$ is formula (4):

$$L_{projection} = \begin{cases} y_{p(x,y,z)}^2 & z < d_{x,y} \\ (1 - y_{p(x,y,z)})^2 & z = d_{x,y}, \\ 0 & z > d_{x,y} \end{cases} \quad (4)$$

wherein $y_{p(x,y,z)}$ represents a value of the predicted 3D shape $y_p$ at a position (x,y,z), $y_{p(x,y,z)} \in \{0,1\}$, $d_{x,y}$ is the depth value of the input image x at a position (x,y).

2. The 3D reconstruction method based on deep learning according to claim 1, wherein in step (2), using a 3D depth convolution AE with jump connection to connect a feature layer of an encoder to a decoder accordingly.

3. The 3D reconstruction method based on deep learning according to claim 2, wherein
   in step (2), a network structure comprises the encoder and the decoder: the encoder has four 3D convolution layers, each convolution layer of four 3D convolution layers has a bank of 4×4×4 filters of 1×1×1 strides, followed by a leaky ReLU activation function and a maximum pooling layer; then there are two fully connected layers, a second fully connected layer of the two fully connected layers is the potential vector learned; the decoder consists of four symmetric anti convolution layers; each layer of the four symmetric anti convolution layers concatenates a plurality of feature layers of the encoder accordingly, followed by a plurality of ReLU activations except for a last layer of the plurality of feature layers with sigmoid function, a calculation process is:
   $64^3(1) \rightarrow 32^3(64) \rightarrow 16^3(128) \rightarrow 8^3(256) \rightarrow 4^3(512) \rightarrow 32768 \rightarrow 5000 \rightarrow 32768 \rightarrow 4^3(512) \rightarrow 8^3(256) \rightarrow 16^3(128) \rightarrow 32^3(64) \rightarrow 64^3(1)$.

4. The 3D reconstruction method based on deep learning according to claim 3, wherein
   in step (2), by making the predicted 3D shape as close as possible to a real 3D shape to optimize a plurality of network parameters, objective function $L_t$ of step (2) is formula (5):

$$L_t = -\alpha y_t \log(y'_t) - (1-\alpha)(1-y_t)\log(1-y'_t) \quad (5),$$

wherein $y_t$ is a ground truth value for each voxel, $y'_t$ is a predicted value for the each voxel, a cross entropy is used to measure a quality of reconstruction, for a value of most voxel grids of each object are zero, weight $\alpha$ is applied to a plurality of false positive and false negative samples to balance the value of most voxel grids, in the experiment $\alpha$ is set to 0.85.

5. The 3D reconstruction method based on deep learning according to claim 1, wherein in step (3), a nonlinear binary reconstruction is applied to a voxel set output by a generator with an ELM classifier.

6. The 3D reconstruction method based on deep learning according to claim 5, wherein in step (3), wherein step (3) has three layers in the network: an input layer, a hidden layer and an output layer, an input is a feature of each voxel mesh of an object, a neighborhood value around the each voxel mesh is extracted as a feature value, and a 7-dimensional feature vector is established, a number of hidden layer nodes is determined as 11 by multiple experiments, an output is to judge whether a label of the each voxel is 0 or 1, if an incentive function is infinitely differentiable over any real number interval for an ELM, the network approximates any nonlinear function, and a classifier loss function $L_c$ is formula (6):

$$L_c = y_f^{voxel} - y_t^{voxel} \qquad (6),$$

wherein $y_f^{voxel}$ is a value of the each voxel mesh after the nonlinear binary reconstruction, $y_f^{voxel}$ is the value of the each voxel mesh of the 3D real object.

* * * * *